Dec. 1, 1953   W. H. BISHOP   2,661,234
SLIDING ROOF FOR VEHICLES
Filed Oct. 14, 1950   3 Sheets-Sheet 2

Inventor
William Henry Bishop
by Walter S. Heston
ATTORNEY

Dec. 1, 1953  W. H. BISHOP  2,661,234
SLIDING ROOF FOR VEHICLES
Filed Oct. 14, 1950  3 Sheets-Sheet 3

Inventor
William Henry Bishop
by Walter S. Heston
ATTORNEY

Patented Dec. 1, 1953

2,661,234

UNITED STATES PATENT OFFICE 2,661,234

SLIDING ROOF FOR VEHICLES

William Henry Bishop, Birmingham, England

Application October 14, 1950, Serial No. 190,118

6 Claims. (Cl. 296—137)

This invention relates to improvements in sliding roofs for vehicles of the type in which an opening in the front part of the roof is adapted to be closed by a longitudinally slidable panel which when opened slides under a fixed canopy over the rear part of the roof. Means operated by a handle on the panel are provided for locking the panel in the closed, open, and any desired intermediate position, and means associated with the locking mechanism are provided for raising the rear edge of the panel when closed to bring it into a position flush with the rear canopy and for lowering it when it is desired to open the panel so that the panel can slide under the canopy. The panel is slidably guided at each side on longitudinally extending flanges forming part of a watercheck frame extending around the opening below the level of the roof, and the frame provides a continuous channel to receive any water which may find its way between the panel and the roof, any such water being drained off through drain tubes connected to the watercheck frame.

One of the objects of my invention is to reduce to a minimum the entry of water and dirt between the sliding panel and the roof, and another object is to facilitate the assembly and maintenance of the sliding roof.

According to my invention the side edges of the sliding panel carry upwardly and outwardly inclined or curved flexible rubber or other sealing strips which seat against and are adapted to slide along under inwardly directed lips or flanges on the roof at each side of the opening.

At its front end the panel is conveniently formed with a forwardly extending inclined flange stepped down below the level of the panel and adapted, when the panel is closed, to engage under and make a seal with a complementary rubber member secured to the underside of a rearwardly extending flange on the roof across the front of the opening.

At its rear edge the panel has a downwardly stepped transverse channel in which is mounted a rubber bead, and when the rear edge of the roof is raised into the closed and locked position this bead is urged into sealing engagement with a seating on the underside of the front part of the fixed rear canopy.

Thus when the panel is closed the normal clearances between its edges and the adjacent edges of the roof around the opening are substantially sealed and the entry of water and dirt is reduced to a minimum. The panel will therefore function satisfactorily for much longer periods without attention and there is very little risk of it being jammed or rendered stiff to operate.

According to a further feature of my invention the slides for the front end of the panel which are guided on outwardly directed lips or flanges on the inner walls of the watercheck frame are pivotally mounted in brackets or lugs on the panel and when the panel is moved rearwardly to a position beyond its normal fully open position the slides come into alignment with notches or gaps in the guide flanges. The front edge of the panel can then be lifted to bring the slides up through the notches above the level of the guide flanges and the panel can be drawn forwardly until the rear slides come into alignment with the notches, whereupon the panel can be lifted out. To replace the panel or to fit it originally these operations are simply carried out in the reverse order.

Thus the panel can be readily removed at any time for inspection, cleaning or maintenance of the panel or of the watercheck frame or guides without having to remove any screws or effect any other dismantling.

A practical form of sliding roof embodying my invention is illustrated by way of example in the accompanying drawings in which.

Figure 1:
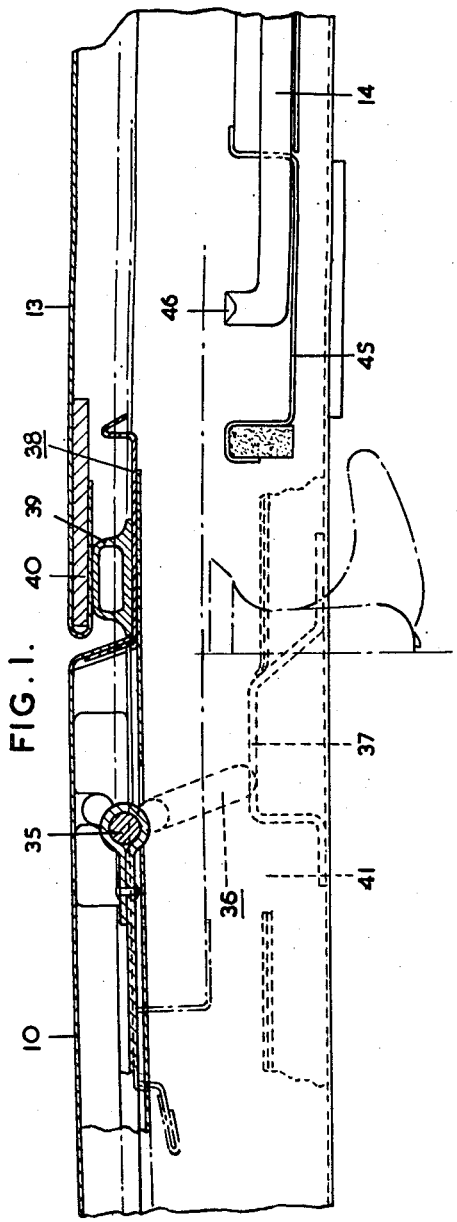
Figure 1 is a longitudinal section of the complete roof which has been divided into three for convenience of illustration, the central part being shown above the front and rear parts.

The sliding roof illustrated follows generally the known construction of such roofs. The sheet metal sliding panel 10 is adapted to cover and uncover a longitudinal opening in the front part of a vehicle roof 11. A watercheck frame 12 of channel section extends across the front and along each side of the opening and is continued rearwardly under a fixed canopy 13 forming the rear part of the roof. An outwardly directed lip or flange 14 on the inner edge of the watercheck frame forms a guide for the sliding panel at each side of the opening and the frame carries on its inner surface a fibre tacking strip 15 for the attachment of the usual head lining for the roof.

Figure 2:
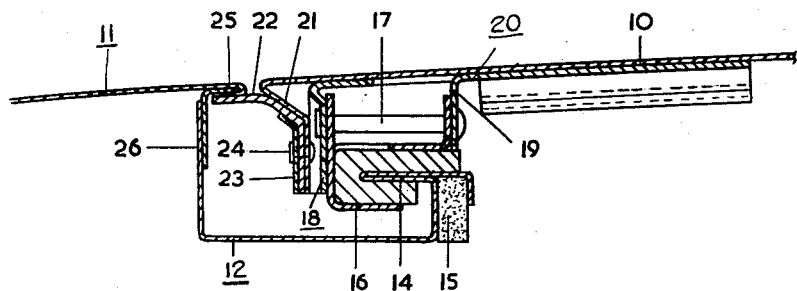
Figure 2 is a fragmentary transverse section through one of the front slides and the side member of the watercheck frame showing the panel in the normal raised position.
Figure 3:
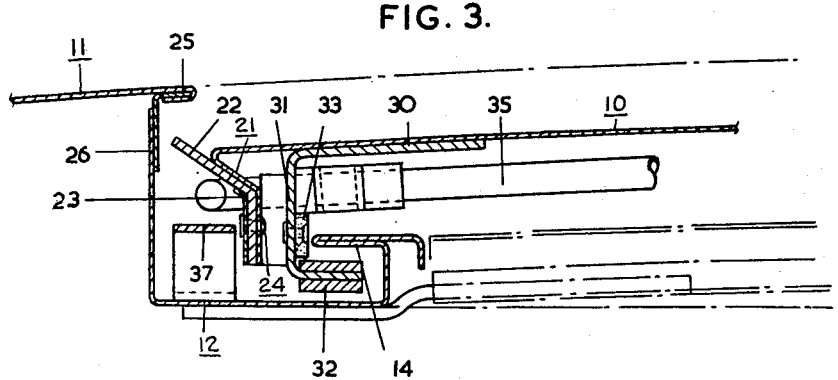
Figure 3 is a similar section through one rear slide and the adjacent parts showing the panel in the lowered position.
Figure 4:
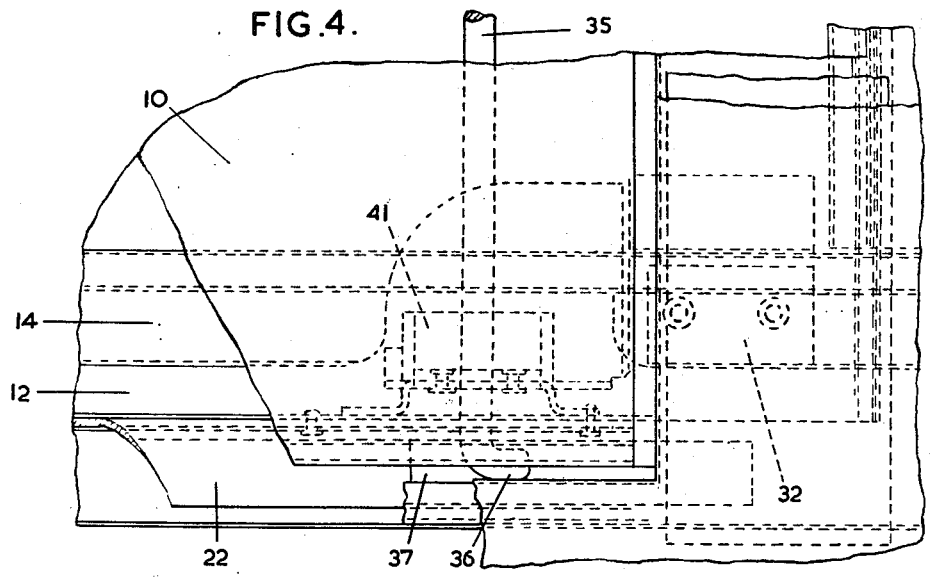
Figure 4 is a plan of one rear corner of the sliding panel.
Figure 5:
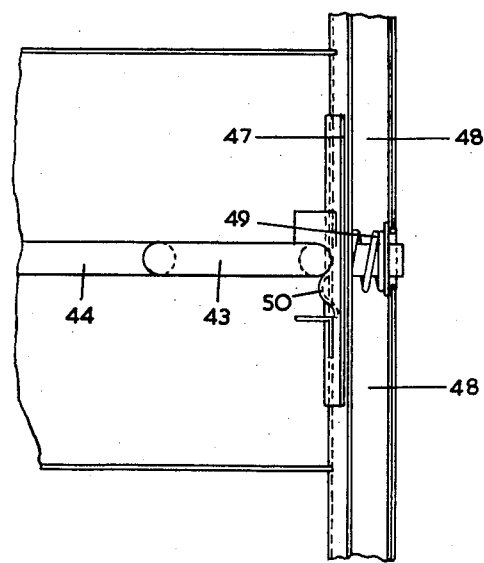
Figure 5 is a fragmentary plan showing the rear end of the stop for sliding panel.

The front end of the panel is guided at each side by means of a felt-lined slide 16 which engages the lip 14 on the watercheck frame as shown in Figure 2 and is pivotally mounted by means of a horizontal pin 17 in spaced lugs 18, 19 projecting downwardly from a reinforcing bracket 20 spot-welded or otherwise secured to the underside of the panel.

Each side edge of the panel is cranked downwardly and inwardly to form an inclined step or rebate 21 to which is secured a flexible rubber or other sealing strip 22 which is retained in position by a curved sheet metal strip 23 secured to the rebate by rivets 24 passing through the sealing strip. The free upper part of the sealing strip is curved or inclined upwardly and outwardly and is adapted to engage against the underside of a lip or flange 25 extending inwardly from the edge of the roof opening. This lip or flange is conveniently formed as shown in Figure 2 by folding the edge of the roof sheeting over a horizontal inwardly extending flange on a metal strip 26 secured to and extending upwardly from the outer wall of the watercheck frame.

At its front end the panel is formed with a forwardly extending inclined flange 27 stepped down below the level of the panel and adapted, when the panel is closed as shown in Figure 1, to engage under and make a seal with a complementary rubber member 28 secured to the underside of a rearwardly extending flange 29 on the roof across the front of the opening.

Adjacent to the rear end of the panel on each side a bracket 30 secured to the underside of the panel has a downwardly extending flange 31 with an inwardly directed lip on its lower edge carrying a felt pad 32 adapted to slide in the watercheck frame below the guide flange 14. A felt or fibre pad 33 is fixed to the inner face of the flange 31 in alignment with the guide flange 14 to locate the panel against lateral displacement.

The mechanism for raising the rear edge of the panel into a position flush with the canopy when the panel is closed is substantially the same as described in the specification of Patent No. 2,156,615. A rotatable handle 34 at the front end of the panel is arranged through linkage to move angularly a transverse bar 35 at the rear end of the panel.

Cranked arms 36 at the ends of the rod are in alignment when the panel is closed, with raised abutments 37 mounted in the watercheck frame, and the angular movement of the rod forces these arms against the abutments to raise the rear end of the panel vertically. The rear edge of the panel is provided with a downwardly stepped transverse channel 38 in which is mounted a hollow rubber bead 39, and when the panel is raised into the closed and locked position, as shown in Figure 1, this bead is urged into sealing engagement with a seating 40 on the underside of the front part of the fixed rear canopy 13.

In the closed position of the panel the felt pads 32 are in alignment with and can move upwardly through gaps 41 cut in the guide flanges 14 of the watercheck frame as the rear edge of the panel is raised. When the handle is moved into the locked position with the panel in any intermediate position the arms 36 are urged against the bottom of the watercheck frame and urge the pad 32 upwardly against the guide flange 14 to hold the panel frictionally in the set position.

The normal rearward opening movement of the panel is limited by a stop formed by an upstanding cranked portion 43 of a rod 44 extending longitudinally below the rear canopy 13 and concealed by the head lining. The front end of the rod is rotatably mounted in a cross-member 45 adjacent to the front of the rear canopy and terminates in a cranked finger-piece 46 which is accessible by inserting the finger between the cross-member and the canopy. The rear end of the rod is rotatably mounted in a bracket 47 on a cross-member 48 at the rear end of the roof, and the rod is loaded axially by a spring 49 to urge the rear end of the cranked portion 43 into engagement with a lug 50 on the bracket which holds the rod in each of two angular positions. Normally the rod is in the positions shown in Figure 1 with the cranked portion 43 extending vertically and forming a positive stop for the rear edge of the sliding panel.

When it is desired to remove the panel the rod is turned through 90° to bring the cranked portion 43 into a horizontal plane so that the panel can slide rearwardly over it. This allows the panel to slide back far enough to bring the front slides 16 into alignment with the gaps 41 in the guide flanges 14 in the watercheck frame so that the front end of the panel can be lifted to bring the slides up through the gaps 41 above the level of the guide flanges, and the panel can then be drawn forwardly until the rear pads 32 come into alignment with the gaps whereupon the panel can be lifted out.

To replace the panel or to fit it originally these operations are simply carried out in the reverse order.

If any water should find its way into the watercheck frame it is drained away in the usual manner by drain tubes 51 arranged at the front and rear corners of the frame.

I claim:

1. A sliding roof of the kind set forth for vehicles comprising inwardly directed flanges on the roof at each side of the roof opening, flexible sealing strips including lower portions secured to the side edges of the sliding panel, and free upper portions which extend outwardly and upwardly beyond the top face of said panel when said panel is withdrawn from said opening, and which are bent so as to bear sealingly against the undersides of said flanges when said panel closes said opening.

2. A sliding roof of the kind set forth for vehicles comprising inwardly directed flanges on the roof at each side of the roof opening, downwardly cranked side edges on the sliding panel forming inclined rebates, flexible sealing strips secured with their lower portions against said rebates, and including free portions upwardly and outwardly extending from said rebates for sliding engagement with the undersides of said flanges.

3. A sliding roof of the kind set forth for vehicles as in claim 2 further comprising a water check frame extending along at least each side of said roof opening below said sliding panel, each of said flanges being formed by a metal strip secured to and extending upwardly from the outer wall of the watercheck frame, a horizontal inwardly extending lip on the upper edge of said strip, and a portion of the roof around the opening folded over said lip.

4. A sliding roof of the kind set forth for vehicles comprising inwardly directed flanges on the sides of the roof opening, upwardly and outwardly directed flexible sealing members on the side edges of the sliding panel for sliding engagement with said flanges, a water check frame extending along at least each side of said roof opening below said sliding panel, a slide pivotally mounted on each side of said panel adjacent to its front end and engaging slidably with a longitudinal guide flange on the watercheck frame, a gap in said guide flange adjacent to the rear end of the roof opening, and a movable stop for normally arresting the rearward movement of the panel before the slide reaches the gap, said stop being movable to permit the panel to be slid rearwardly beyond its normal open position to bring the slide into alignment with the gap so that the slide can be lifted through the gap and the panel can be readily detached from the roof.

5. A sliding roof as in claim 4 in which said stop comprises a cranked portion of an angularly movable rod extending longitudinally below the fixed rear canopy of the roof, and having on its front end a finger-piece which is accessible from the inside of the vehicle, means being provided for locating said rod in its operative and inoperative positions.

6. A sliding roof as in claim 4 in which each of said slides is pivotally mounted in lugs on a reinforcing bracket secured to the underside of the sliding panel.

WILLIAM HENRY BISHOP.

References Cited in the file of this patent

UNITED STATES PATENTS

| Number | Name | Date |
|---|---|---|
| 1,899,857 | Dubos | Feb. 28, 1933 |
| 2,272,535 | Votypka | Feb. 10, 1942 |
| 2,338,309 | Votypka | Jan. 4, 1944 |

FOREIGN PATENTS

| Number | Country | Date |
|---|---|---|
| 436,458 | Great Britain | Oct. 11, 1935 |
| 473,477 | Great Britain | Oct. 13, 1937 |
| 503,407 | Great Britain | Apr. 3, 1939 |
| 518,741 | Great Britain | Mar. 6, 1940 |